United States Patent [19]

Mittelhäuser

[11] Patent Number: 4,732,463
[45] Date of Patent: Mar. 22, 1988

[54] MIRROR WITH ADJUSTMENT ELEMENTS INCLUDING BELLOWS FOR A MOTOR VEHICLE

[76] Inventor: Bernhard Mittelhäuser, No. 57 D-3002, Wedemark 2, Fed. Rep. of Germany

[21] Appl. No.: 893,672

[22] Filed: Aug. 6, 1986

[51] Int. Cl.⁴ .............................. G02B 7/18; B60R 1/06
[52] U.S. Cl. .................................... 350/632; 350/636; 350/637
[58] Field of Search ....................... 350/632, 636, 637; 248/481–483, 487; 74/501 M

[56] References Cited

U.S. PATENT DOCUMENTS 2,928,318  3/1960  Friday ................................. 350/636
3,013,392  12/1961  Falge et al. ......................... 350/637

FOREIGN PATENT DOCUMENTS 3443745  6/1986  Fed. Rep. of Germany ...... 350/632
42738  4/1979  Japan .................................. 350/637

Primary Examiner—Jon W. Henry
Attorney, Agent, or Firm—Becker & Becker, Inc.

[57] ABSTRACT

An adjustable mirror for a motor vehicle, especially a mirror for the outside of the vehicle. The mirror has at least two adjustment elements that act upon the mirror element. These adjustment elements can be selectively actuated by a control element. In order to provide an adjustment mechanism that does not depend upon electrical power, is precise, and reliable, the control element, the adjustment elements, and the associated connections form a closed hydraulic system. A bellows is advantageously the active adjustment element, while the adjustment members themselves can be embodied as working cylinders.

12 Claims, 7 Drawing Figures

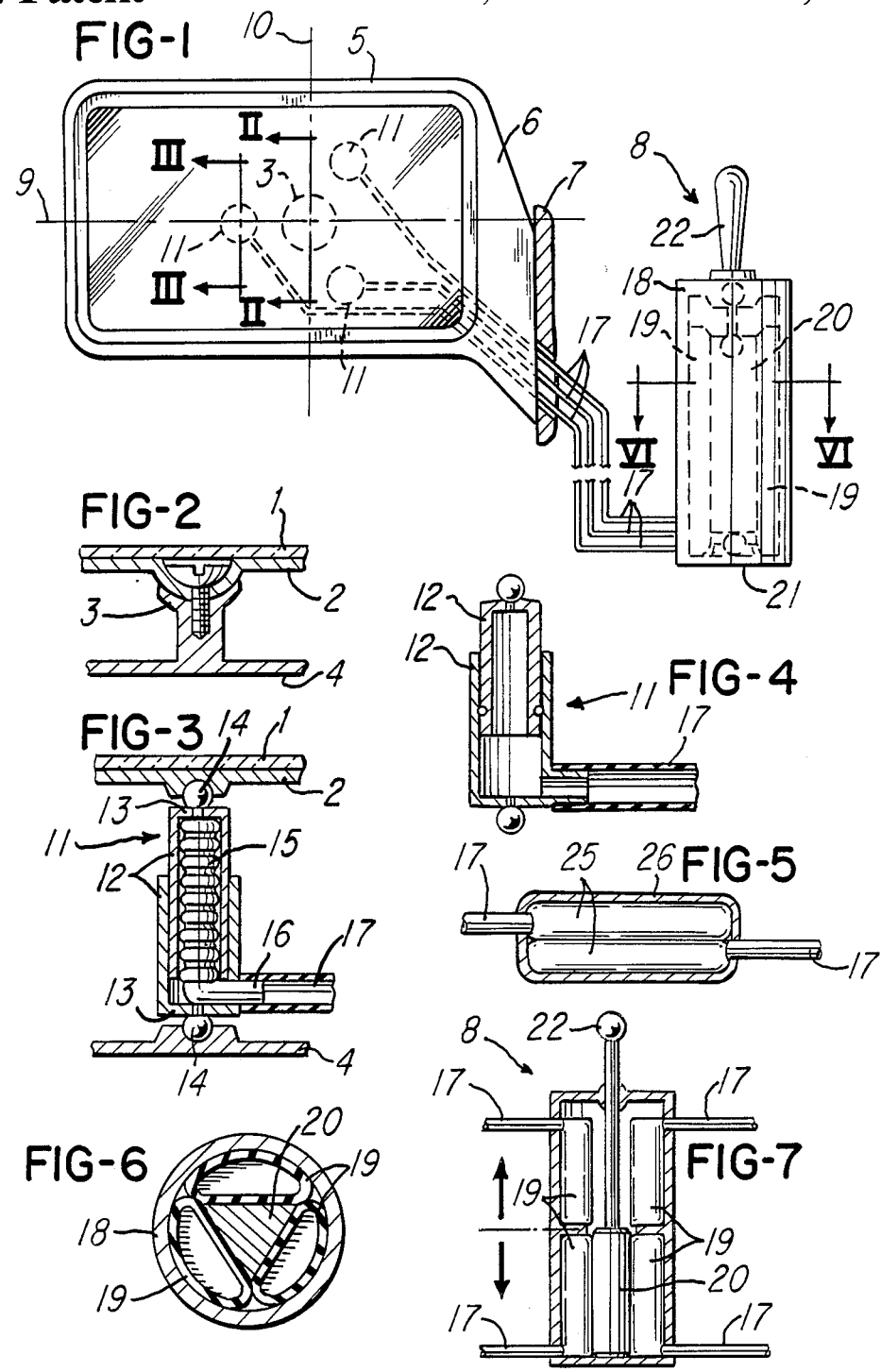

MIRROR WITH ADJUSTMENT ELEMENTS INCLUDING BELLOWS FOR A MOTOR VEHICLE

BACKGROUND OF THE INVENTION

1. Field of the Invention

The present invention relates to an adjustable rear view or side view mirror for a motor vehicle, especially a mirror for the outside of the vehicle. The mirror has at least two adjustment elements that act upon the mirror element. A control element can selectively control these adjustment elements.

2. Description of the Prior Art

Such remotely controlled mirrors can be adjusted from the inside of the vehicle, for which purpose, pursuant to heretofore known proposals, electrical drive mechanisms, electrical controllers, and even cables are used. Electrical devices of this type require a source of power, and cables are complicated and susceptible to breakdown.

An object of the present invention therefore is to provide an adjustment system that does not depend upon electricity, operates very precisely, and in addition is very reliable.

BRIEF DESCRIPTION OF THE DRAWING

This object, and objects and advantages of the present invention, will appear more clearly from the following specification in conjunction with the accompanying schematic drawing, in which:

FIG. 1 is a view that shows one inventive embodiment of an outside vehicle mirror together with a control element;

FIG. 2 is a cross-sectional view taken along the line II—II in FIG. 1;

FIG. 3 is a cross-sectional view taken along the line III—III in FIG. 1;

FIG. 4 is a cross-sectional view through an adjustment element that differs from the one of FIG. 3;

FIG. 5 is a cross-sectional view of the connection between an adjustment element and the control element;

FIG. 6 is a cross-sectional view taken along the line VI—VI in FIG. 1; and

FIG. 7 is a cross-sectional view of a control element that can be used for the adjustment of two mirrors, such as a mirror on both the left and right side of a vehicle.

SUMMARY OF THE INVENTION

The mirror of the present invention comprises: a housing; a mirror element that is adjustably supported in the housing; at least two adjustment elements that are disposed in the housing for effecting adjustment of the mirror elements; and a control element that is operatively connected, via connecting means, with the adjustment elements to form a closed hydraulic system, whereby the adjustment elements can be selectively respectively actuated by the control element.

Whereas hollow bodies having a constant volume are used for the connecting means, hollow bodies having volumes that can change are used for the control element and the adjustment elements. These changeable-volume hollow bodies are preferably some type of bellows, so that a deformation at the control element conveys the pressure medium to the adjustment elements, where the pressure medium can effect a change of shape at the adjustment elements in order in this fashion to be able to bring about the desired change in angle of the mirror element.

Although bellows are more advantageous in many cases due to their good sealing ability, it is also possible to use in place of the bellows small working cylinders, the stroke of which results in the desired movements for the adjustment of the mirror element.

In order to be able to carry out an adjustment of the mirror element about a vertical axis and about a horizontal axis, it is generally necessary to use three adjustment elements that are disposed in the corners of an imaginary triangle. In conformity therewith, three connection lines must be provided that lead to the control element, which unites the associated control bellows or the like in an expedient manner, so that the three control bellows can be selectively acted upon by a single control member, with the latter expediently being mounted in a ball-and-socket-like manner so that at any given time a specific control bellows can be deformed.

Another important feature is to dispose the bellows of the adjustment elements in a tubular or cylindrical member to prevent the diameter of the bellows from expanding. This prevents tampering with the mirror adjustment. Thus, the bellows should for all practical purposes vary only in length.

Further specific features of the present invention will be discussed in detail subsequently.

Description of Preferred Embodiments

Referring now to the drawing in detail, the essentially rectangular mirror body or element 1 is secured to a plate 2 which, approximately in the center, is supported by, and can be pivoted in all directions by, the ball-and-socket-like joint 3.

To receive the mirror element 1, the lower end of the ball-and-socket-like joint 3 is connected to the back side 4 of the essentially cup-shaped housing 5. Via a bracket 6 that is disposed on the side, the housing 5 is connected to a vehicle indicated by the reference numeral 7. Disposed within the vehicle is the control element 8 for adjusting the mirror element 1 about a horizontal axis 9 and a vertical axis 10. This adjustment is effected with the aid of adjustment elements 11 that at the bottom are pivotably connected to the back side 4, and at the top are pivotably connected to the plate 2. Three adjustment elements 11 are provided in the corners of an imaginary equilateral triangle, with the ball-and-socket-like joint 3 being disposed approximately in the centroid of this triangle. With the aid of that adjustment element 11 disposed in the horizontal axis 9, the mirror element 1 can be pivoted about the vertical axis 10, and with the aid of the two other adjustment elements 11, the mirror element 1 can be pivoted about the horizontal axis 9.

The adjustment element 11 of FIG. 3 comprises two sleeves 12 that are telescopically disposed within one another with little pay. Each of the sleeves 12 has a closed base 13, the outside of which supports a pivot element 14. The thus provided interior of the sleeves 12, the length of which can be varied, serves to accommodate a bellows 15 which at the bottom, in the vicinity of the back side 4, is provided with a hose connection 16. The flexible hose 17 leads from the connection 16, through the bracket 6, into the vehicle, and from there into the control element 8. Within a round housing 18, the hoses 17 lead into flexible elongated bellows 19, a respective one of the which is provided for each of the adjustment elements 11. These bellows 19 are distributed uniformly over the periphery of the housing 18, resting against the inner surface thereof. The three bellows 19 surround an approximately triangular elongated displacement element 20 that is made of solid material. The displacement element 20 is pivotably connected to the base 21 of the housing 18, and at the top is pivotably connected to a control rod 22 that itself is pivotably mounted. Thus, by pivotably moving the control rod 22, a particular bellows 19 can be stressed or deformed. Since oil under pressure is located in a bubble-free manner in the bellows 19 the hoses 17 and the bellows 15, each displacement of the bellows 19 results in a change in the length of the bellows 15, whereby the adjustment elements 11 become extended and carry out a corresponding adjustment movement of the mirror element 1. This adjustment is effected instantaneously and very precisely. The two adjustment elements 11 that are disposed opposite one another relative to the horizontal axis 9 make it unnecessary to have return springs or the like. Thus, for an adjustment of the mirror element 1 it is sufficient to provide the aforementioned triangular arrangement of the adjustment elements 11 with the centrally disposed ball-and-socket-like joint 3.

As shown in FIG. 4, the bellows 15 can also be replaced by a piston/cylinder arrangement, i.e. the illustrated sleeves 12, that are sealed off relative to one another.

It may be necessary for design reasons to interrupt the hose lines. In such a case, it is expedient to have the hose ends, that have to be connected, end or terminate, in a bellows-like fashion so that these bellows-like ends, 25 (FIG. 5) can act upon one another. This is made possibly by disposing the ends 25 in a fixed, rigid housing 26. Pressure in one of the hoses 17 leads to an enlargement of the associated bellows or end 25, which then transfers the pressure to the adjacent bellows or end 25. If the housing 26 is partitioned, the hose connection can be discontinued or again established in a simple manner.

The special configuration of the control element 8 pursuant to FIG. 7 makes it possible to be able to adjust two adjustment systems. Thus, the three bellows 19 disposed at the top are associated with a first mirror, and the three bellows disposed at the bottom are associated with aother mirror, for example on the other side of the vehicle. By vertically displacing the displacement element 20, it is possible to act upon either group of bellows 19. In the position illustrated in FIG. 7, the bellows 19 at the bottom are acted upon when the control rod 22 is actuated or pivoted. However, if the displacement element 20 is pulled up, it is then possible to deform the bellows at the top when the control rod 22 is moved.

The present invention is, of course, in no way restricted to the specific disclosure of the specification and drawing, but also encompasses any modification within the scope of the appended claims.

What is claimed is:

1. An adjustable mirror for a motor vehicle, comprising:
   a housing;
   a mirror element adjustably supported in said housing;
   at least two adjustment elements disposed in said housing for effecting adjustment of said mirror element; and
   a control element that is operatively connected, via connection means, with said adjustment elements to form a closed hydraulic system, whereby said adjustment elements can be respectively selectively actuated by said control element, said control element including a displacement element that is movable in all directions; said displacement element being surrounded by deformable bellows that are operatively connected to said adjustment elements via said connection means.

2. A mirror according to claim 1, which includes two groups of bellows, with each group being operatively connected to the adjustment elements of different mirrors; said displacement element is selectively movable for interaction with either of said groups of bellows.

3. A mirror according to claim 2, which includes a longitudinally movable control rod to effect said movement of said displacement element.

4. An adjustable mirror for a motor vehicle, comprising:
   a housing;
   a mirror element adjustably supported in said housing;
   at least two adjustment elements disposed in said housing for effecting adjustment of said mirror element; and
   a control element that is operatively connected, via connection means, with said adjustment elements to form a closed hydraulic system, whereby said adjustment elements can be respectively selectively actuated by said control element, said connection means between said control element and each adjustment element being interrupted, forming adjacent ends that are each provided with a deformable bellows that rests against one another in such a way that deformation of one leads to deformation of the other.

5. A mirror according to claim 4, in which said bellows are removably disposed in a further housing.

6. A mirror according to claim 4, in which each of said adjustment elements is provided with a bellows as an active adjustment component.

7. A mirror according to claim 6, in which each of said bellows is surrounded by sleeve means that prevent expansion of the diameter of said bellows.

8. A mirror according to claim 4, in which each of said adjustment elements is embodied as a working cylinder.

9. A mirror according to claim 4, in which said mirror element is supported approximately centrally via a ball-and-socket-like joint; and which includes three adjustment elements disposed in the corners of an imaginary, approximately equilateral triangle, with said ball-and-socket-like joint being disposed in the centroid of said triangle.

10. A mirror according to claim 9, in which said mirror body has an essentially horizontal pivot axis, with one of said adjustment elements being disposed in said horizontal pivot axis, and the other two adjustment elements being disposed equidistantly from said horizontal pivot axis.

11. A mirror according to claim 1, which includes three of said deformable bellows; and in which said displacement element has an approximately triangular cross-sectional shape, with said bellows resting against the side surfaces of said displacement element and being enclosed by a further housing.

12. A mirror according to claim 1, in which said displacement element has two ends, both of which are mounted via ball-and-socket-like joints in such a way that said displacement element can pivot in all directions; a control rod that is itself pivotable in all directions engages one of said ends of said displacement element.

* * * * *